United States Patent
Junk

(10) Patent No.: US 9,411,321 B2
(45) Date of Patent: Aug. 9, 2016

(54) METHODS AND SYSTEM FOR MINOR LOOP FEEDBACK FALLBACK

(71) Applicant: Fisher Controls International LLC, Marshalltown, IA (US)

(72) Inventor: Kenneth Junk, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 342 days.

(21) Appl. No.: 13/922,046

(22) Filed: Jun. 19, 2013

(65) Prior Publication Data

US 2013/0345834 A1     Dec. 26, 2013

Related U.S. Application Data

(60) Provisional application No. 61/661,930, filed on Jun. 20, 2012.

(51) Int. Cl.
*G05B 9/03* (2006.01)

(52) U.S. Cl.
CPC .................................... *G05B 9/03* (2013.01)

(58) Field of Classification Search
None
See application file for complete search history.

(56) References Cited

U.S. PATENT DOCUMENTS

| | | | |
|---|---|---|---|
| 6,272,401 B1* | 8/2001 | Boger | F15B 5/006 700/282 |
| 7,222,016 B2 | 5/2007 | Snowbarger et al. | |
| 8,190,305 B1 | 5/2012 | Prince et al. | |
| 2004/0236472 A1 | 11/2004 | Junk et al. | |
| 2005/0278074 A1* | 12/2005 | Junk | F15B 5/006 700/282 |
| 2006/0031001 A1* | 2/2006 | Snowbarger | G05B 5/00 701/114 |
| 2016/0033942 A1 | 2/2016 | Junk | |

OTHER PUBLICATIONS

Patent Cooperation Treaty, "International Preliminary Report on Patentability", issued in connection with PCT Patent Application No. PCT/US2013/046803, issued on Dec. 23, 2014, 5 pages.
Patent Cooperation Treaty, "International Search Report", issued in connection with PCT Patent Application No. PCT/US2013/046803, mailed on Sep. 27, 2013, 3 pages.
Patent Cooperation Treaty, "Written Opinion", issued in connection with PCT Patent Application No. PCT/US2013/046803, mailed on Sep. 27, 2013, 4 pages.

* cited by examiner

*Primary Examiner* — Sean Shechtman
*Assistant Examiner* — Steven Garland
(74) *Attorney, Agent, or Firm* — Hanley, Flight & Zimmerman, LLC

(57) ABSTRACT

Methods and system for minor loop feedback fallback are disclosed. An example apparatus includes a minor loop feedback having a first mode and a second mode. The first mode is to output a first value used to control a process control device in a normal operation. The second mode is to output a second value used to control the process control device during a failure condition. The apparatus includes a controller to transition between the first mode and the second mode based on an identification of the failure condition.

25 Claims, 6 Drawing Sheets

METHODS AND SYSTEM FOR MINOR LOOP FEEDBACK FALLBACK

RELATED APPLICATION

This patent claims priority to U.S. Provisional Application Ser. No. 61/661,930, which was filed on Jun. 20, 2012, and is hereby incorporated herein by reference in its entirety.

FIELD OF THE DISCLOSURE

This disclosure relates generally to minor loop feedback fallback, and, more particularly, to methods and system for minor loop feedback fallback.

BACKGROUND

A variety of control mechanisms may be used to control a valve/actuator assembly or other process control device. For example, valve controllers may use a feedback control to control the valve/actuator assembly. The feedback control uses an error signal based on a difference between a desired set point signal and a feedback signal.

FIGURES

DETAILED DESCRIPTION

Figure 1:
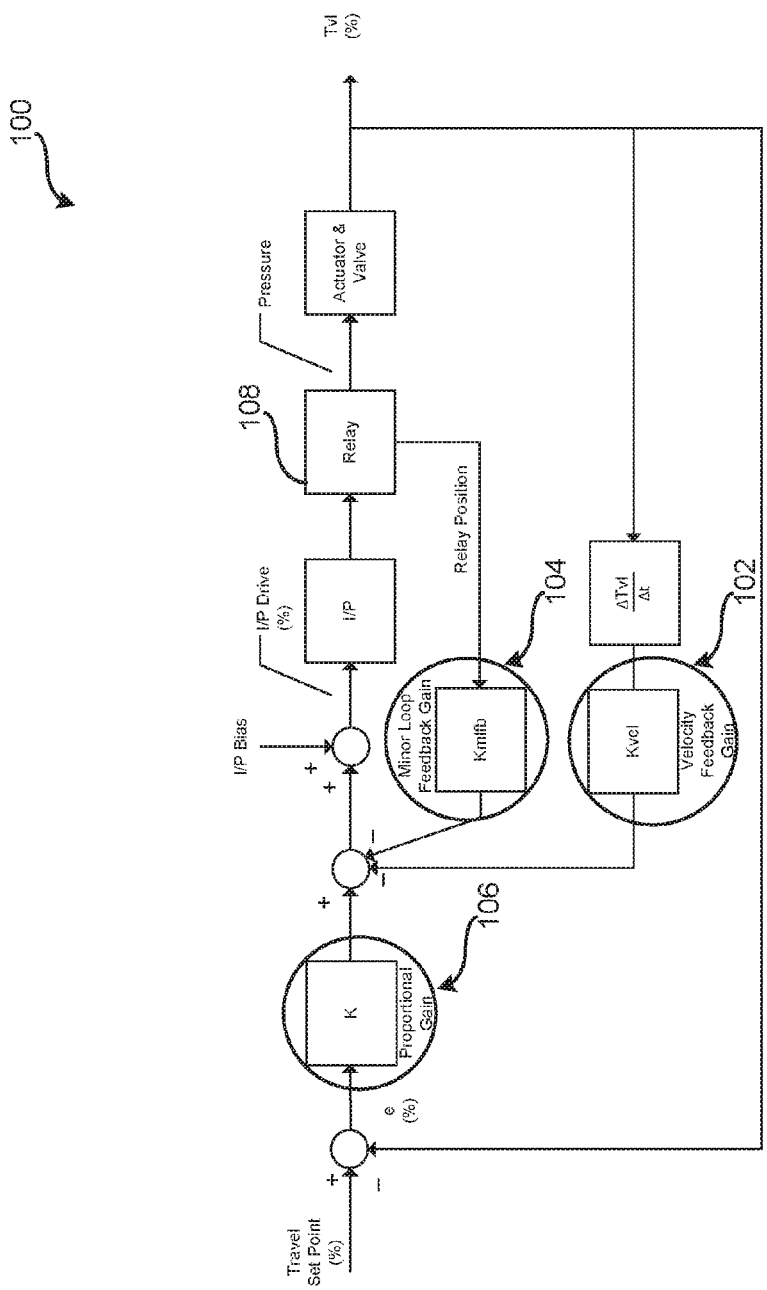
FIG. 1 depicts an example servo controller of a digital positioner that may be used to implement the examples disclosed herein.

Minor loop feedback may be used to stabilize a positioner response. In some known systems, if a minor loop feedback sensor fails, the positioner (e.g., a DVC6200 digital valve controller) will oscillate about a given set point, causing an unstable response in valve travel. In other known systems, a current source may generate a large magnetic field that is picked up by the minor loop feedback sensor, introducing a transient disturbance in the feedback compensation circuit that causes the valve to move in an uncontrolled fashion. In other examples, thermal cycling, vibration, shock or other external environmental factors causes the minor loop feedback sensor to go out of range, become invalid and/or cause the minor loop feedback sensor connection to become damaged and/or fail.

Interferences, which may disturb the control system, may be introduced by a transient disturbance caused by a two-way radio or a constant disturbance caused by nearby processes or machinery. In examples where the minor loop feedback sensor fails, the minor loop feedback signal may remain constant near its null state, the minor loop feedback signal may remain at a constant value significantly off its null state and/or significant bias may be introduced into the minor loop feedback compensation loop. In some examples, having the minor loop feedback signal remain near a null state causes a closed loop system response to oscillate around a set point. In some examples, having the minor loop feedback signal remain constant at a value significantly off a null state causes the closed loop system response to oscillate around a set point plus a bias. In some examples, having a significant bias introduced into the minor loop feedback causes the control valve to saturate at one end or the other.

In examples where the feedback signal is unreliable (e.g., a two-way radio is used near a sensor including a magnet), a transient disturbance can be introduced into the servo control causing a stem of a process control device to move in an uncontrolled manner. Some sensors that may be affected by an external magnetic field include Hall effect sensors and/or GMRs. In some examples, a minor loop feedback failure may be identified when there is a limit cycle in the travel feedback signal but the minor loop feedback signal is constant. In some examples, the minor loop feedback signal may be correlated with a dp/dt feedback signal to identity a difference and/or a failure. In some examples, when there is a change identified in the dp/dt feedback signal without a corresponding change identified in the GMR, the minor loop fallback may be used to control minor loop feedback in the positioner. In some examples, to identify external disturbances, the minor loop feedback signal can be correlated with the PP drive signal. In examples in which the minor loop feedback signal leads the I/P drive signal, there may be an external disturbance to the minor loop feedback signal. Additionally or alternatively, one or more sensors may be used that provide a signal indicative of a minor loop feedback failure.

The examples disclosed herein provide minor loop feedback fallback control if a minor loop feedback sensor fails. In some examples, the example minor loop fallback may be implemented by digital dp/dt (the time derivative of actuator pressure (p)). In some examples, dp/dt feedback controls minor loop feedback in the positioner. In some examples, dp/dt feedback may be used to dampen a response when the positioner is controlling travel or when the positioner is controlling pressure. In some examples, the digital dp/dt feedback is as effective at damping the positioner as the GMR. In some examples, the digital dp/dt feedback is included in a pressure servo controller, but is not visible to the end user. The digital dp/dt feedback may be implemented in the pressure servo controller as a backup for applications where the GMR is unable to be calibrated for pressure (e.g., a hot cutover).

The examples disclosed herein address failures of and/or severe biases introduced into a minor loop feedback. In some examples, if the signal from the GMR is substantially and/or significantly outside of an operating range, the forward path gain may be automatically reduced (e.g., divided by three with a lower limit of two) and the dp/dt, which may be digitally implemented, may be used as a backup minor loop feedback. Additionally or alternatively, if the pressure sensor fails, a minor loop feedback gain may be set to zero and the forward path gain may be automatically reduced by, for example, a factor of three with a fixed upper limit and/or a fixed lower limit. In some examples, fixing the upper limit ensures that large forward path gains are sufficiently reduced, thereby ensuring a stable response.

Additionally and/or alternatively, in some examples, the velocity feedback may be increased to provide additional damping to the servo controller. In some such examples, the forward path gain may be reduced by a factor of 3 with a minimum value of 2.8. For example, during normal operation, forward path gain (K) may equal 12, minor loop feedback as implemented by relay position (Kmlfb) may equal 35 and velocity feedback gain (Kvel) may equal 4. In some examples, during a failure condition in which the minor loop feedback sensor fails, K may be reduced to 4, Kmlfb may be set to zero and Kvel may be increased to 15. In some examples, during a failure condition in which the pressure sensor fails, K may equal 4, Kmlfb may equal 0 and Kvel may equal 15. However, if dp/dt is used for minor loop feedback, the remainder of the system does not have to be detuned. Additionally, the examples disclosed herein may include add-ons such as failure alerts, automatic or manual recovery, adjustments of the velocity feedback gain and/or adjustments of the pressure fallback gains and/or servo mechanism.

FIG. 1 depicts a servo controller 100 of a digital positioner. The servo controller 100 is a high gain proportional controller with two damping elements. In this example, the damping elements include a velocity feedback 102 and a minor loop feedback 104. In some examples, tuning the servo controller 100 includes adjusting a forward gain path 106, the velocity feedback 102 and the minor loop feedback 104.

In the servo controller 100, the minor loop feedback 104, which is the dominant damping element, may be predicted based on a position of a relay 108. The velocity feedback 102 may also dampen the response of the controller 100, but is not as effective at damping the servo controller 100 as the minor loop feedback 104.

Figure 2:
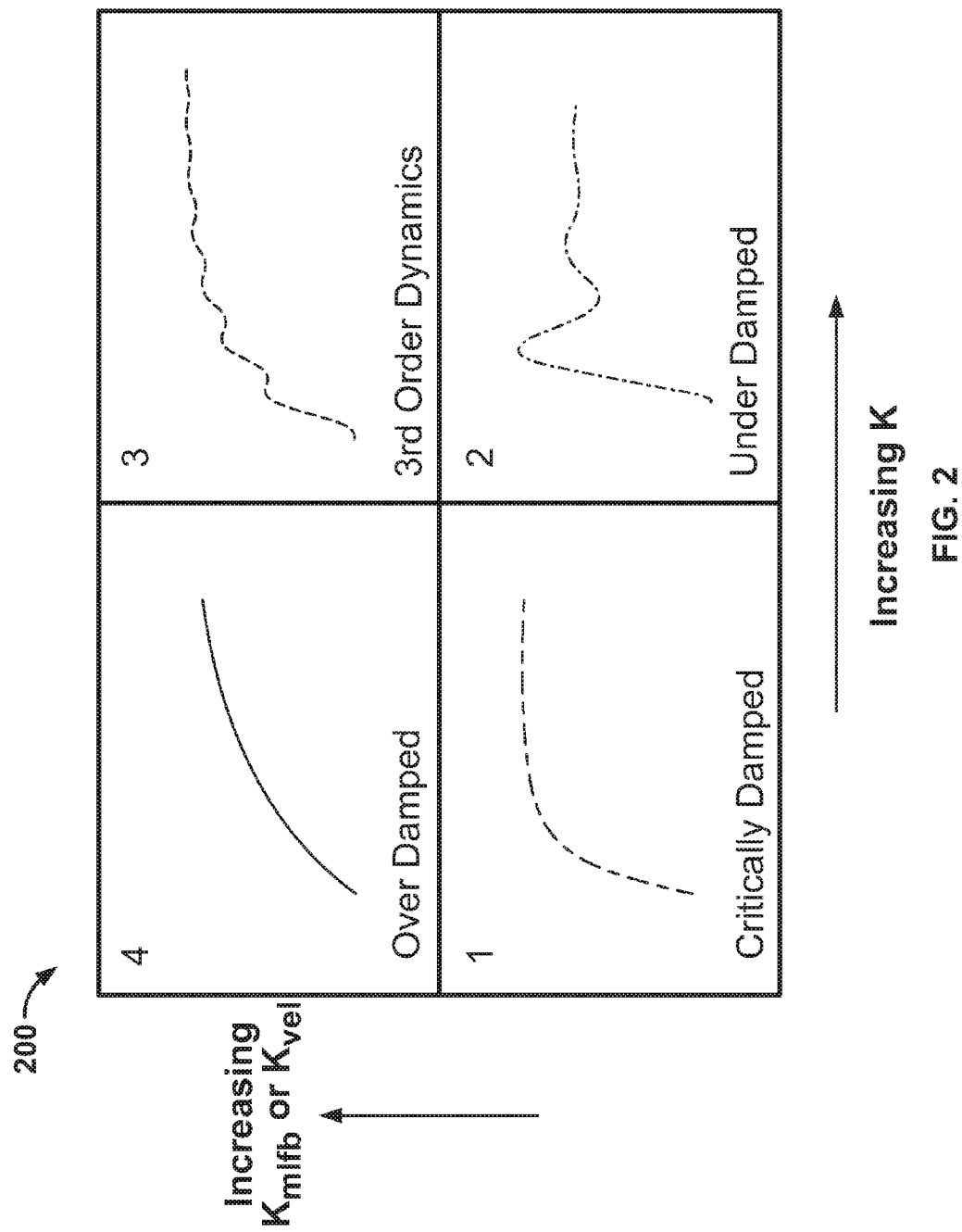
FIG. 2 depicts an example tuning map.

FIG. 2 depicts an example tuning map 200. When tuning a servo such as the servo controller 100, a forward gain path may be increased to have as high a gain as possible without destabilizing the system. In some examples, as the forward path gain is increased, the damping is increased by increasing the minor loop feedback gain. Without minor loop feedback gain and/or increasing the minor loop feedback gain, the system may become unstable.

Figure 3:
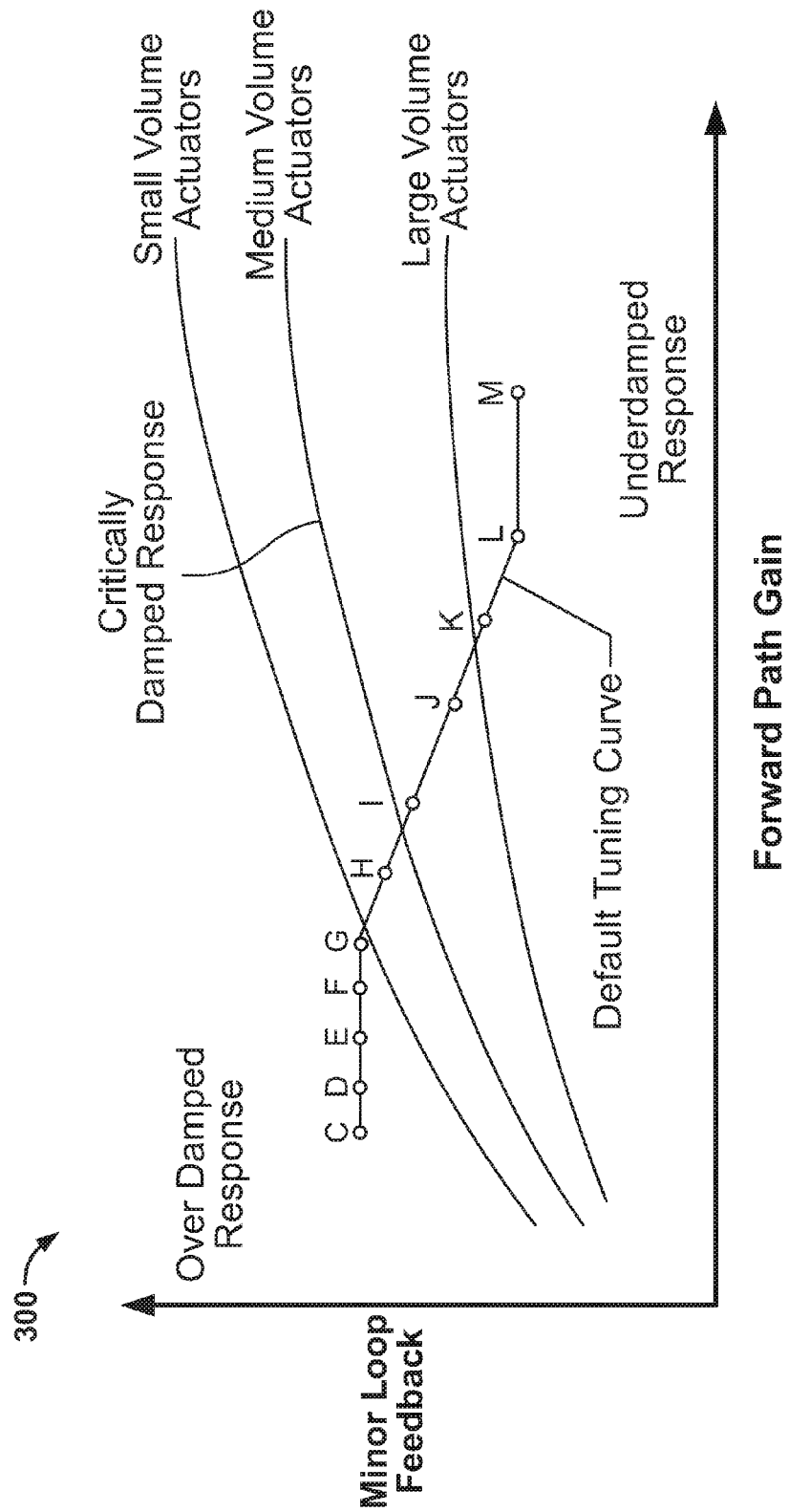
FIG. 3 depicts a graph of example processes to tune a valve.

FIG. 3 depicts a graph of example processes 300 of tuning a valve. In the processes 300, it is assumed that a minor loop feedback is active and functional. If the minor loop feedback fails (e.g., a sensor fails), the valve may become unstable and start to oscillate.

Figure 4:
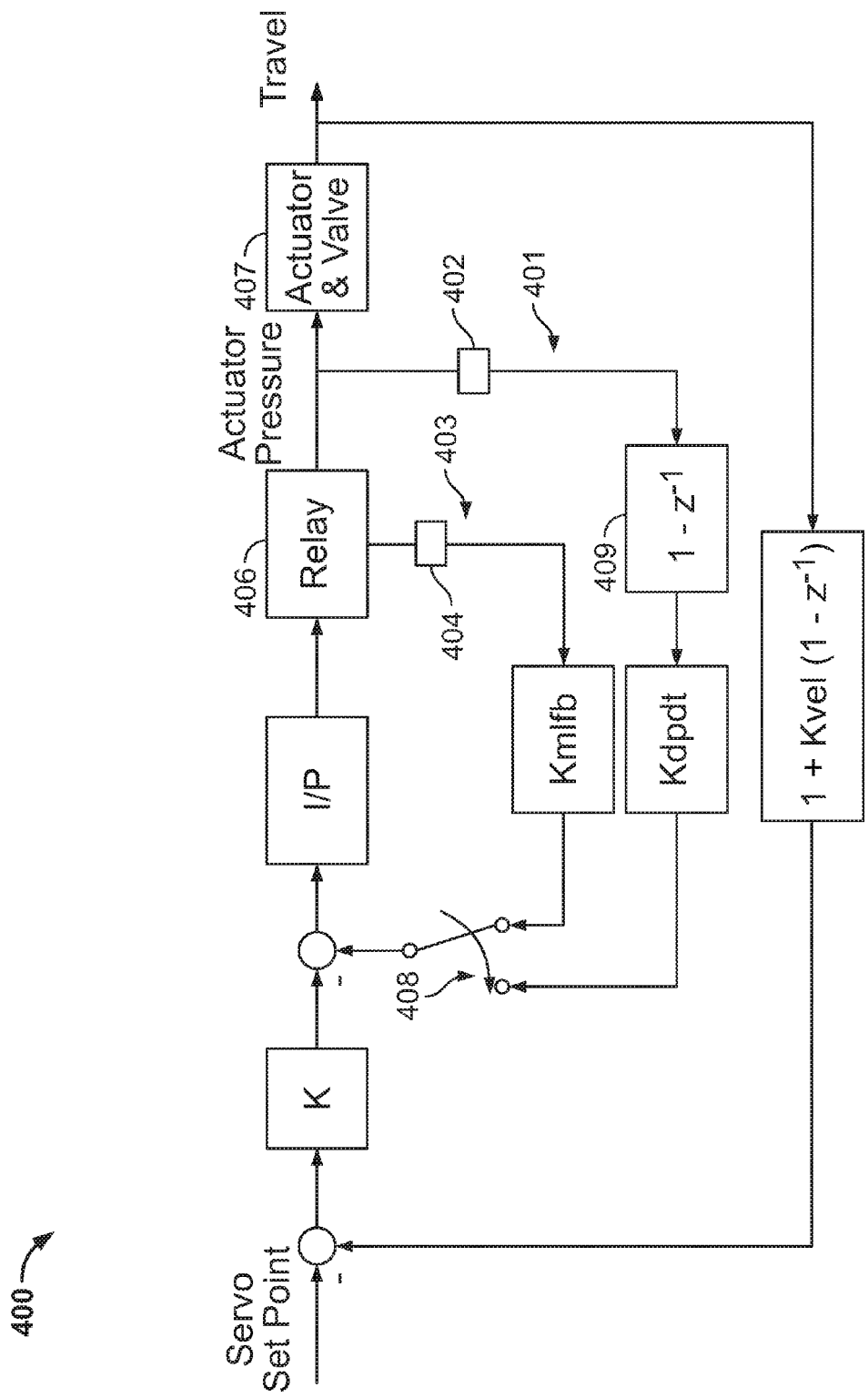
FIG. 4 depicts an example servo controller including an example pressure fallback.

FIG. 4 depicts an example servo controller 400 including a first minor loop feedback control path 401 associated with an example pressure fallback sensor and/or pressure sensor 402 and a second minor loop feedback control path 403 associated with a minor loop feedback sensor 404. In some examples, the pressure fallback sensor 402 determines a minor loop feedback gain value and/or a minor loop feedback value by taking a derivative of a pressure obtained downstream of a relay 406 and upstream of a process control device 407 (see 409). In some examples, the minor loop feedback sensor 404 determines a minor loop feedback gain value and/or a minor loop feedback value based on a position of the relay 406. As discussed above, the minor loop feedback gain value may be used to dampen the servo controller 400.

In operation, if the minor loop feedback sensor 404 fails and/or is unstable, the servo controller 400 automatically switches via a switch 408 from the minor loop feedback sensor 404 to the pressure fallback sensor 402 (e.g., switches from a first minor loop feedback control mode to a second minor loop feedback control mode). Thus, even if the first minor loop feedback control mode fails, the servo controller 400 continues to operate. In some examples, an estimate of the derivative, dp/dt, used in the second minor loop feedback control mode, can be written as $(p[k])-p[k-1])/dt$. In examples in which dt is a fixed sample rate, the dt may be included in a gain factor and a difference equation, $p[k]-p[k-1]$, may be used to determine a minor loop feedback gain value and/or a minor loop feedback value, where p is actuator pressure, k is an index, k−1 is the previous index.

Figure 5:
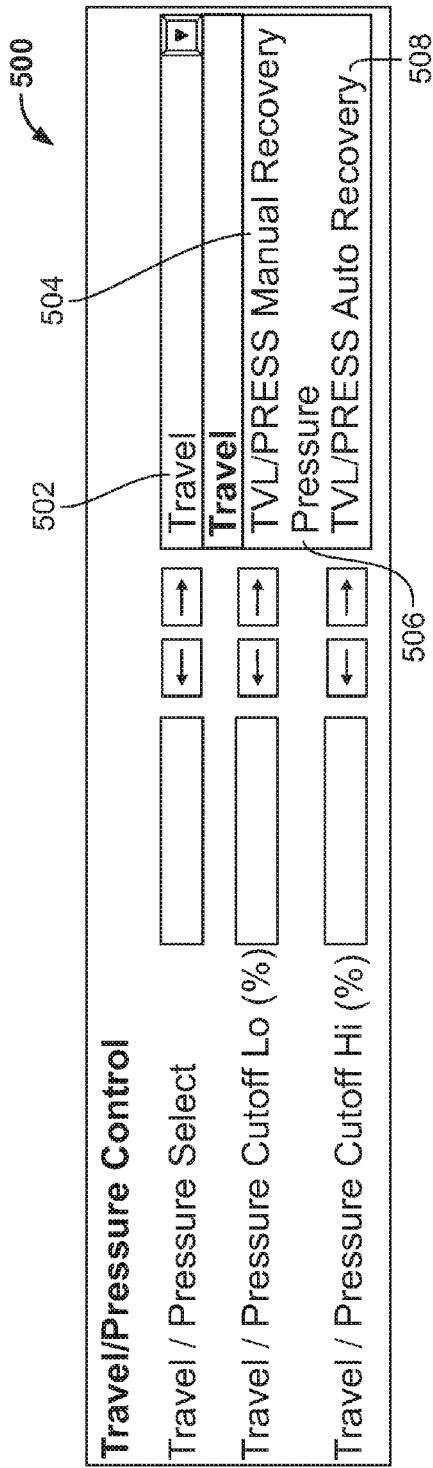
FIGS. 5 and 6 depict example screenshots of processes and/or operations that may be used to implement the examples disclosed herein.

FIG. 5 depicts an example screenshot 500 of a process and/or operation that may be used to implement the examples disclosed herein. Travel 502 may be associated with forced travel control and TVL/PRESS manual recovery 504 may be associated with pressure fallback if the travel sensor fails. In some examples, if a travel sensor failure alarm occurs, to switch back to travel control (e.g., travel 502), the travel sensor failure alarm is cleared and the power of the system is cycled. Pressure 506 is associated with forced pressure control and TVL/PRESS auto recovery 508 is associated with pressure fallback if the travel sensor fails. In some examples, if a travel sensor failure alarm occurs and is thereafter cleared, the system automatically transitions back to travel control (e.g., travel 502). While FIG. 5 is shown for pressure fallback in the event of a travel sensor failure, a similar user interface may be used for configuring minor loop feedback fallback.

Figure 6:
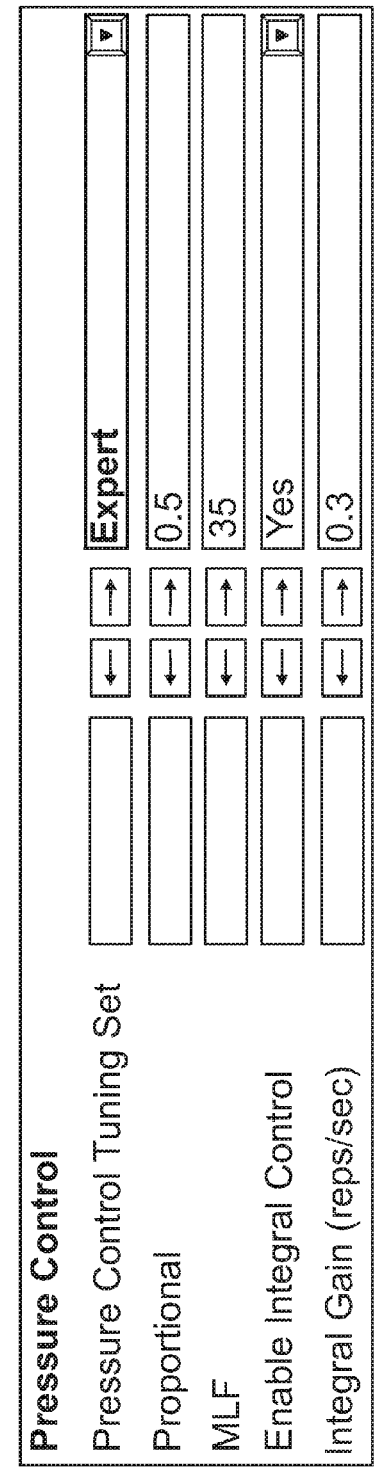

FIG. 6 depicts an example screenshot 600 of a process and/or operation that may be used to implement the examples disclosed herein and, specifically, to control pressure tuning. In some examples, pressure tuning set letters C-M are to match tuning set letters travel H and pressure H. In some examples, tuning set B is for bellows or configurations with restrictive accessories downstream of a positioner such as needle valves (e.g., type 111 needle valve of Emerson Process Management) and/or their equivalents. In some examples, integral control is required for pressure control. However, in other examples, integral control may not be required for pressure control. In some examples, Kdp/dt is included as a tuning parameter. In some examples, expert mode is used when there are accessories downstream of a positioner because a response of the system is tuned around a volume of tubing to the accessories and not the volume of the actuator.

Figure 7:
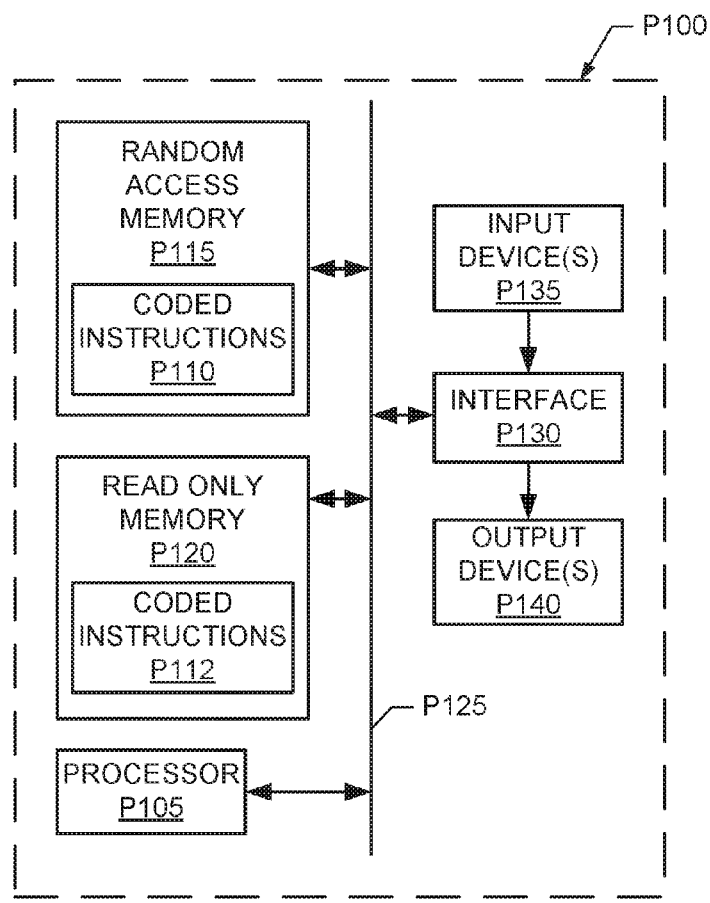
FIG. 7 is a schematic illustration of an example processor platform that may be used and/or programmed to implement any or all of the example systems and methods described herein.

FIG. 7 is a schematic diagram of an example processor platform P100 that may be used and/or programmed to implement to implement the examples disclosed herein. For example, the processor platform P100 can be implemented by one or more general purpose processors, processor cores, microcontrollers, etc.

The processor platform P100 of the example of FIG. 7 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

As set forth herein, an example method includes determining a first minor loop feedback value using a first control mode and controlling a process control device at least partially based on the first minor loop feedback value. In some examples, the method includes identifying the first minor loop feedback value being outside of a predetermined range or a failure of the first control mode, determining a second minor loop feedback value using a second control mode and controlling the process control device at least partially based on the second minor loop feedback value.

In some examples, the first control mode includes determining a position of a relay upstream of the process control device. In some examples, the second control mode includes determining an output pressure of a relay upstream of the process control device. In some examples, the second control mode also includes determining a derivative of the output pressure to determine the second minor loop feedback value. In some examples, the method also includes identifying a failure of the second control mode and controlling the process control device at least partially based on a third minor loop feedback value and a reduced forward path value. The third minor loop feed value is approximately zero.

In some examples, the reduced forward path value includes a fixed upper limit or a fixed lower limit. In some examples, the reduced forward path value is approximately one third of a normal operation path value. In some examples, the method includes providing an alert when the first minor loop feedback value is identified as being outside of the predetermined range or the failure of the first control mode is identified. In some examples, the method also includes reducing a forward path value when the first minor loop feedback value is identified as being outside of the predetermined range or the failure of the first control mode is identified.

An example apparatus includes a first sensor to identify a first value used to determine a first minor loop feedback value. The first value is based on a relay position of a relay upstream of a process control device. The apparatus includes a second sensor to identify a second value used to determine a second minor loop feedback value. The second value is based on an output pressure of the relay. The apparatus includes a controller to use the second minor loop feedback value to at least partially control the process control device based on the first minor loop feedback value being outside of a predetermined range. In some examples, the second sensor includes a pressure sensor. In some examples, the second sensor includes a fallback control sensor. In some examples, the first sensor includes a minor loop feedback sensor. In some examples, the controller is to reduce a forward path value when the first minor loop feedback value is identified as being outside of a predetermined range.

Another example apparatus includes a minor loop feedback having a first mode and a second mode. The first mode is to output a first value used to control a process control device in a normal operation. The second mode is to output a second value used to control the process control device during a failure condition. The apparatus includes a controller to transition between the first mode and the second mode based on an identification of the failure condition.

In some examples, the first mode is to determine a first minor loop feedback value based on a position of a relay upstream of the process control device. In some examples, the second mode is to determine a second minor loop feedback value based on an output pressure of a relay upstream of the process control device. In some examples, the controller is to provide an alert when the failure condition is identified. In some examples, the controller is to reduce a forward path gain value when the failure condition is identified. In some examples, the reduced forward gain path value comprises a fixed upper limit or a fixed lower limit.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
    determining a first minor loop feedback value using a first control mode;
    controlling a process control device at least partially based on the first minor loop feedback value;
    identifying the first minor loop feedback value being outside of a predetermined range or a failure of the first control mode;
    determining a second minor loop feedback value using a second control mode;
    controlling the process control device at least partially based on the second minor loop feedback value; and
    identifying a failure of the second control mode and controlling the process control device at least partially based on a third minor loop feedback value and a reduced forward path value, the third minor loop feedback value is approximately zero, wherein the reduced forward path value comprises a fixed upper limit or a fixed lower limit.

2. The method of claim 1, wherein the first control mode comprises determining a position of a relay upstream of the process control device.

3. The method of claim 1, wherein the second control mode comprises determining an output pressure of a relay upstream of the process control device.

4. The method of claim 3, wherein the second control mode further comprises determining a derivative of the output pressure to determine the second minor loop feedback value.

5. The method of claim 1, further comprising providing an alert when the first minor loop feedback value is identified as being outside of the predetermined range or the failure of the first control mode is identified.

6. A method, comprising:
    determining a first minor loop feedback value using a first control mode;
    controlling a process control device at least partially based on the first minor loop feedback value;
    identifying the first minor loop feedback value being outside of a predetermined range or a failure of the first control mode;
    determining a second minor loop feedback value using a second control mode;
    controlling the process control device at least partially based on the second minor loop feedback value; and
    identifying a failure of the second control mode and controlling the process control device at least partially based on a third minor loop feedback value and a reduced forward path value, the third minor loop feedback value is approximately zero, wherein the reduced forward path value is approximately one third of a normal operation path value.

7. The method of claim 6, wherein the first control mode comprises determining a position of a relay upstream of the process control device.

8. The method of claim 6, wherein the second control mode comprises determining an output pressure of a relay upstream of the process control device.

9. The method of claim 8, wherein the second control mode further comprises determining a derivative of the output pressure to determine the second minor loop feedback value.

10. The method of claim 6, further comprising providing an alert when the first minor loop feedback value is identified as being outside of the predetermined range or the failure of the first control mode is identified.

11. A method, comprising:
- determining a first minor loop feedback value using a first control mode;
- controlling a process control device at least partially based on the first minor loop feedback value;
- identifying the first minor loop feedback value being outside of a predetermined range or a failure of the first control mode;
- determining a second minor loop feedback value using a second control mode;
- controlling the process control device at least partially based on the second minor loop feedback value; and
- reducing a forward path value when the first minor loop feedback value is identified as being outside of the predetermined range or the failure of the first control mode is identified.

12. The method of claim 11, further comprising identifying a failure of the second control mode and controlling the process control device at least partially based on a third minor loop feedback value and a reduced forward path value, the third minor loop feedback value is approximately zero.

13. The method of claim 11, wherein the first control mode comprises determining a position of a relay upstream of the process control device.

14. The method of claim 11, wherein the second control mode comprises determining an output pressure of a relay upstream of the process control device.

15. The method of claim 14, wherein the second control mode further comprises determining a derivative of the output pressure to determine the second minor loop feedback value.

16. The method of claim 11, further comprising providing an alert when the first minor loop feedback value is identified as being outside of the predetermined range or the failure of the first control mode is identified.

17. An apparatus, comprising:
- a first sensor to identify a first value used to determine a first minor loop feedback value, the first value based on a relay position of a relay upstream of a process control device;
- a second sensor to identify a second value used to determine a second minor loop feedback value, the second value based on an output pressure of the relay; and
- a controller to use the second minor loop feedback value to at least partially control the process control device based on the first minor loop feedback value being outside of a predetermined range, wherein the controller is to reduce a forward path value when the first minor loop feedback value is identified as being outside of a predetermined range.

18. The apparatus of claim 17, wherein the second sensor comprises a pressure sensor.

19. The apparatus of claim 17, wherein the second sensor comprises a fallback control sensor.

20. The apparatus of claim 17, wherein the first sensor comprises a minor loop feedback sensor.

21. An apparatus, comprising:
- a minor loop feedback having a first mode and a second mode, the first mode to output a first value used to control a process control device in a normal operation, the second mode to output a second value used to control the process control device during a failure condition; and
- a controller to transition between the first mode and the second mode based on an identification of the failure condition, wherein the controller is to reduce a forward path gain value when the failure condition is identified.

22. The apparatus of claim 21, wherein the first mode is to determine a first minor loop feedback value based on a position of a relay upstream of the process control device.

23. The apparatus of claim 21, wherein the second mode is to determine a second minor loop feedback value based on an output pressure of a relay upstream of the process control device.

24. The apparatus of claim 21, wherein the controller is to provide an alert when the failure condition is identified.

25. The apparatus of claim 21, wherein the reduced forward gain path value comprises a fixed upper limit or a fixed lower limit.

* * * * *